United States Patent

Deutsch et al.

[11] Patent Number: 5,499,491
[45] Date of Patent: Mar. 19, 1996

[54] COTTON HARVESTER

[75] Inventors: Timothy A. Deutsch, Newton; Gary L. Warnsholz, Des Moines, both of Iowa

[73] Assignee: Deere & Company, Moline, Ill.

[21] Appl. No.: 364,350

[22] Filed: Dec. 27, 1994

Related U.S. Application Data

[62] Division of Ser. No. 101,206, Aug. 3, 1993, Pat. No. 5,406,779.

[51] Int. Cl.[6] ................................................. A01D 46/08
[52] U.S. Cl. ........................ 56/10.2 H; 56/10.9; 56/11.9; 56/DIG. 11
[58] Field of Search ........................ 56/10.2 H, 10.2 G, 56/10.9, 11.1, 11.9, DIG. 11, DIG. 15

[56] References Cited

U.S. PATENT DOCUMENTS

| | | |
|---|---|---|
| 2,741,888 | 4/1956 | Hamel et al. |
| 3,050,922 | 8/1962 | Massey. |
| 3,144,742 | 8/1964 | Zeismer. |
| 3,358,430 | 12/1967 | Attebery. |
| 3,378,309 | 4/1968 | Copley et al. |
| 3,401,510 | 9/1968 | Hubbard. |
| 3,546,859 | 12/1970 | Owen. |
| 3,837,149 | 9/1974 | West et al. ............... 55/269 |
| 4,233,040 | 11/1980 | Vogelaar et al. ............ 55/269 |
| 4,271,659 | 6/1981 | McConnell ............... 56/13.3 |
| 4,458,471 | 7/1984 | Herwig ............... 56/10.2 G |
| 4,501,112 | 2/1985 | Thedford et al. ............ 56/13.3 |
| 4,660,359 | 4/1987 | Deutsch ............... 56/13.3 |
| 4,843,803 | 7/1989 | Teijido et al. ............ 56/14.6 |
| 4,906,262 | 3/1990 | Nelson et al. ............... 55/290 |
| 4,928,459 | 5/1990 | Thedford et al. ............ 56/13.3 |
| 5,183,487 | 2/1993 | Lodico et al. ............ 55/289 |

FOREIGN PATENT DOCUMENTS

| | | | |
|---|---|---|---|
| 0685183 | 9/1979 | U.S.S.R. | ............... 56/10.2 H |
| 0835356 | 6/1981 | U.S.S.R. | ............... 56/10.2 H |

*Primary Examiner*—Terry Lee Melius

[57] ABSTRACT

Cotton harvester structure including centrally located, transversely mounted engine, rear mounted water and fuel tanks, and transversely centered conveyor fan having an upper, forwardly extending outlet located just below the level of the cab floor for improved weight distribution, air hose routing and air flow. The fan rotates about a transversely extending axis parallel to the engine crankshaft axis. The crankshaft and fan are connected by a belt and sheave assembly having an electric clutch mounted on a shaft assembly and located outside of the frame. The shaft assembly provides fan support, separates the fan inlet from the clutch, reduces lubrication requirements, and enhances accessibility.

Two variable displacement hydraulic pumps connected to the row unit drive and ground drive motors, respectively, are driven in tandem from the crankshaft at one side of the engine and are adjustable to vary the ratio of row unit speed to harvester ground speed over a range of ratios, including a ratio that synchronizes ground speed and row unit speed. A side mounted radiator with a rotary cleaner is located on the opposite side of the frame between the front and rear wheels. The water and fuel tanks are nested closely to each other and extend rearwardly of the rear wheels.

15 Claims, 5 Drawing Sheets

COTTON HARVESTER

This application is a division of application Ser. No. 08/101,206, filed 3 Aug. 1993, now U.S. Pat. No. 5,406,779.

BACKGROUND OF THE INVENTION

1) Field of the Invention:

The present invention relates generally to cotton harvesters and, more specifically, to improvements in the chassis, unit and ground drives, and air system of such harvesters for providing better weight distribution, improved air flow, and increased accessibility, serviceability and productivity.

2) Related Art:

Cotton harvesters such as the commercially available John Deere Model 9960 Cotton Picker include a plurality of row units supported from the forward end of a main frame. The main frame is supported for movement over the ground by rear steerable wheels and forward drive wheels located below the cab behind the row units. A water or cleaning solution tank is located behind the cab for supplying cleaning fluid to moistener columns in the row units. An engine with a fore-and-aft extending crankshaft is supported by the frame rearwardly of the drive wheels and behind a cage-type centrifugal fan. The fan is belt driven from a sheave on the crankshaft for rotation about a fore-and-aft extending axis. The fan output is offset from the harvester centerline and opens downwardly into a lower rectangular plenum having air outlets on the bottom and sidewalls. The nozzles located on cotton conveying ducts are connected to the outlets by flexible conduits which are routed from the plenum upwardly and forwardly around the solution tank and cab.

Some cotton harvesters have split air systems which utilize two fans, one for each side of the machine. Split systems require twice as many fan drives and longer lengths of air ducts and air hoses, which add to the weight and complexity of the harvester. Both the split and single fan systems have fan bearings that must be greased at regular intervals and are relatively difficult to access and service.

Increased cotton yields coupled with the use of more high capacity row units per machine require greater air flow to adequately convey cotton. The available air systems with outlets coming off at an angle to fan air flow require a relatively large number of parts, and the outlets are often removed a substantial distance behind and below the nozzle areas of the cotton conveying ducts so that long air tubes with complex horizontal and vertical routings are required between the fan and the nozzles. The relatively tortious and lengthy path between the fan output and the duct nozzle limits efficiency of most present air systems and additional cotton handling capacity can only be achieved by increasing the power to the fan.

Weight distribution on a cotton harvester is a significant design consideration and a continual source of difficulty. A large amount of the weight of cotton harvester has to be carried on the forward drive wheels. The weight distribution becomes more critical as the row harvesting capacity is increased by adding more row units ahead of the drive wheels and a larger basket to adequately handle the higher picking capacity of machine. In addition, the present water tank location directly behind the cab puts most of the weight of the tank and its contents on the front drive wheels. The close proximity of the water tank to the ducts of the pneumatic conveying system limits tank configuration and duct placement.

Providing adequate space for the hydraulic pumps that drive a cotton harvester and attachments has also been a continuing source of problems with conventional cotton harvester chassis configurations. The main hydraulic pump drives a hydro motor which powers a transmission for driving the ground wheels and providing row unit drive which is dependant on forward harvester speed. At high speeds, increased loads on components such as those in the spindle drive can increase maintenance and repair costs. Spindle speeds outside a generally acceptable range can also reduce picking efficiency. Recently, to increase harvester life and productivity, attempts have been made to add structure to vary row unit drum speed relative to spindle speed. Such attempts have been hindered by space limitations and the complexity of variable speed transmissions.

A fluid pump for delivering spindle cleaning liquid from the solution tank to the row units is typically powered from the conveyor fan by a belt drive. The belt drive is costly and adds maintenance requirements in a location that is not easily accessed.

Presently available chassis configurations on cotton harvester with fore-and-aft mounted engines typically utilize side mounted screens to filter dust and debris from the air for the cooling systems on the harvester. The hostile environment of the harvester requires that the screens be cleaned manually at regular intervals, for example, each time the basket is dumped, to avoid inefficient cooling and overheating.

BRIEF SUMMARY OF THE INVENTION

It is therefore an object of the present invention to provide an improved cotton harvester. It is another object to provide such a harvester which overcomes all or nearly all of the above-mentioned problems. It is a further object to provide such a harvester having an improved chassis configuration. It is still another object to provide such a harvester with an engine and tank configuration for better weight distribution and service features than at least most previously available harvesters.

It is a further object of the present invention to provide an improved cotton harvester having a more efficient and less complex air system than at least most previously available harvesters. It is another object to provide an efficient air system in which air delivery from fan outlet to cotton conveying ducts is shorter and more direct with less tortious air duct routings. It is yet another object to provide such a system which has an improved mounting and clutch arrangement. It is still another object to provide an improved pump drive for such a harvester.

It is another object to provide an improved cotton harvester with an improved chassis configuration so that additional components such as hydraulic pumps and/or air cleaning mechanisms may be added in easily accessed locations.

It is still another object of the present invention to provide a cotton harvester with an improved engine and air system configuration. It is another object to provide such a harvester with an improved air screen structure which requires less maintenance than the systems on most previously available cotton harvesters.

It is another object to provide an improved ground and row unit drive arrangement for a cotton picker. It is a further object to provide such a drive which is relatively simple in construction and is simple to control, and wherein row unit speed may be synchronized with ground speed or varied over a range of speeds relative to ground speed to best suit existing cotton crop conditions.

Cotton harvester structure is provided having a centrally located, transversely mounted engine and rear mounted water and fuel tanks for improved weight distribution and better accessibility. The conveyor fan is centered between the frame side beams and has an upper, forwardly extending outlet located just below the level of the cab floor. The fan rotates about a transversely extending axis parallel to the engine crankshaft axis. The crankshaft and fan are connected by a belt and sheave assembly on one side of the main frame. An electric clutch mounted on a fan shaft is located a substantial distance from the fan inlet. The fan shaft is rotatably mounted by bearings in a tubing fixed to the fan housing and to the frame. The fan configuration provides improved fan support, reduces lubrication requirements, and enhances accessibility to the clutch. A solution pump may be mounted directly on the fan shaft so that belt or other indirect drive arrangements are eliminated.

Variable displacement hydraulic pumps connected to fixed displacement row unit and ground drive motors are supported by an auxiliary side frame and powered in tandem from the crankshaft at one side of the engine. A third pump for accessories is supported from the side frame and driven by a belt from a crankshaft pulley. The tandem pumps have adjustable control arm structure so that the ratio of row unit drive speed to ground speed can be varied over a range of ratios including a ratio wherein drum speed is synchronized with ground speed for zero relative forward velocity between the spindles and plant, or ratios where drum speed is increased or decreased relative to ground speed for better accommodating a variety of picking conditions.

A side-mounted radiator with a rotary cleaner is located outside the frame between the front and rear wheels on the side of the frame opposite the auxiliary side frame and eliminates frequent manual screen cleaning operations. The water and fuel tanks are suspended between the main fore-and-aft beams of the main frame rearwardly of the rear wheels to reduce front drive wheel loads and provide better harvester weight balance.

These and other objects, features and advantages of the present invention will become apparent to one skilled in the art upon reading the following detailed description in view of the drawings.

DETAILED DESCRIPTION OF THE DRAWINGS

Figure 1:
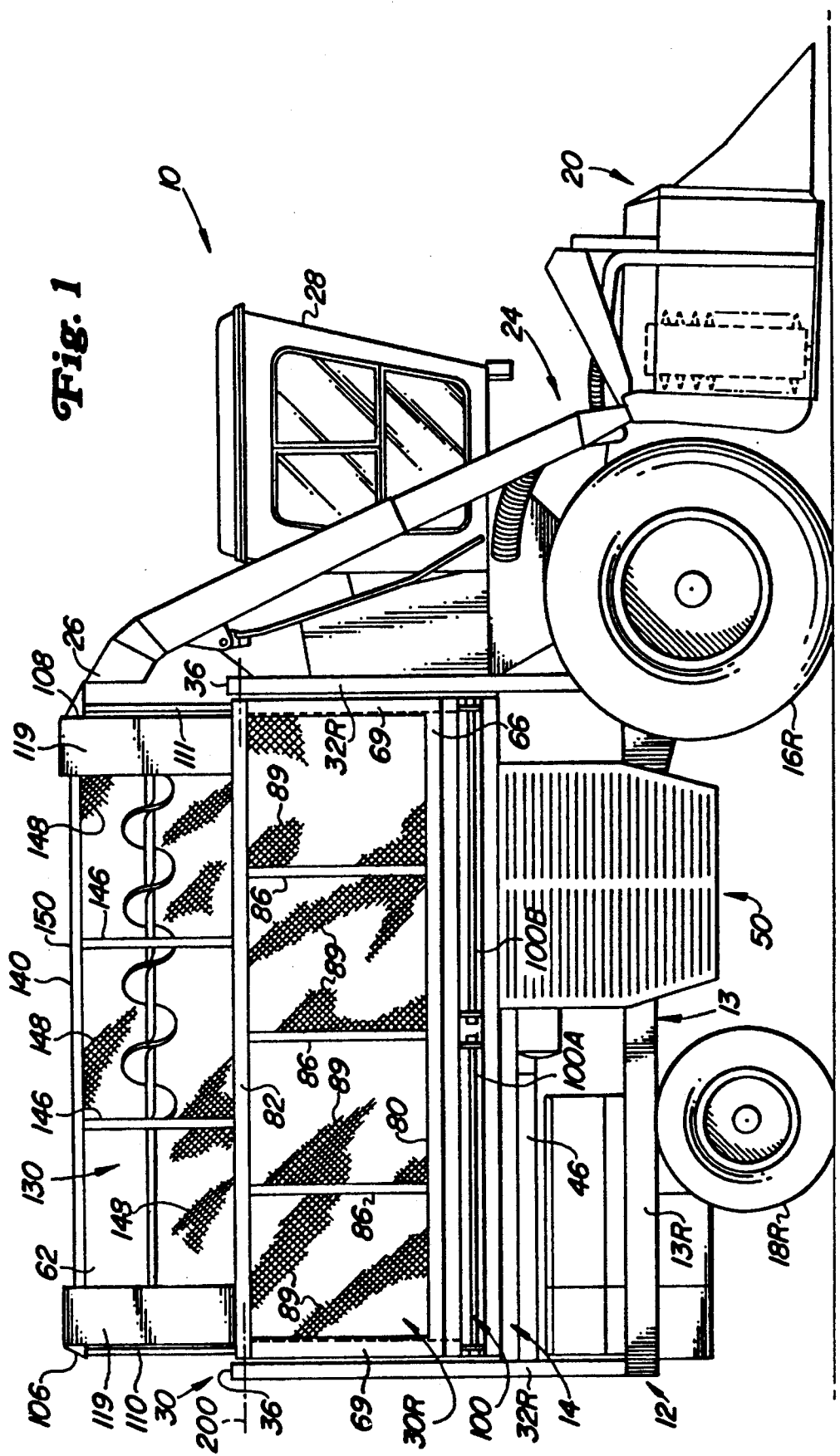
FIG. 1 is a side view of a cotton harvester constructed in accordance with the teachings of the present invention.
Figure 2:
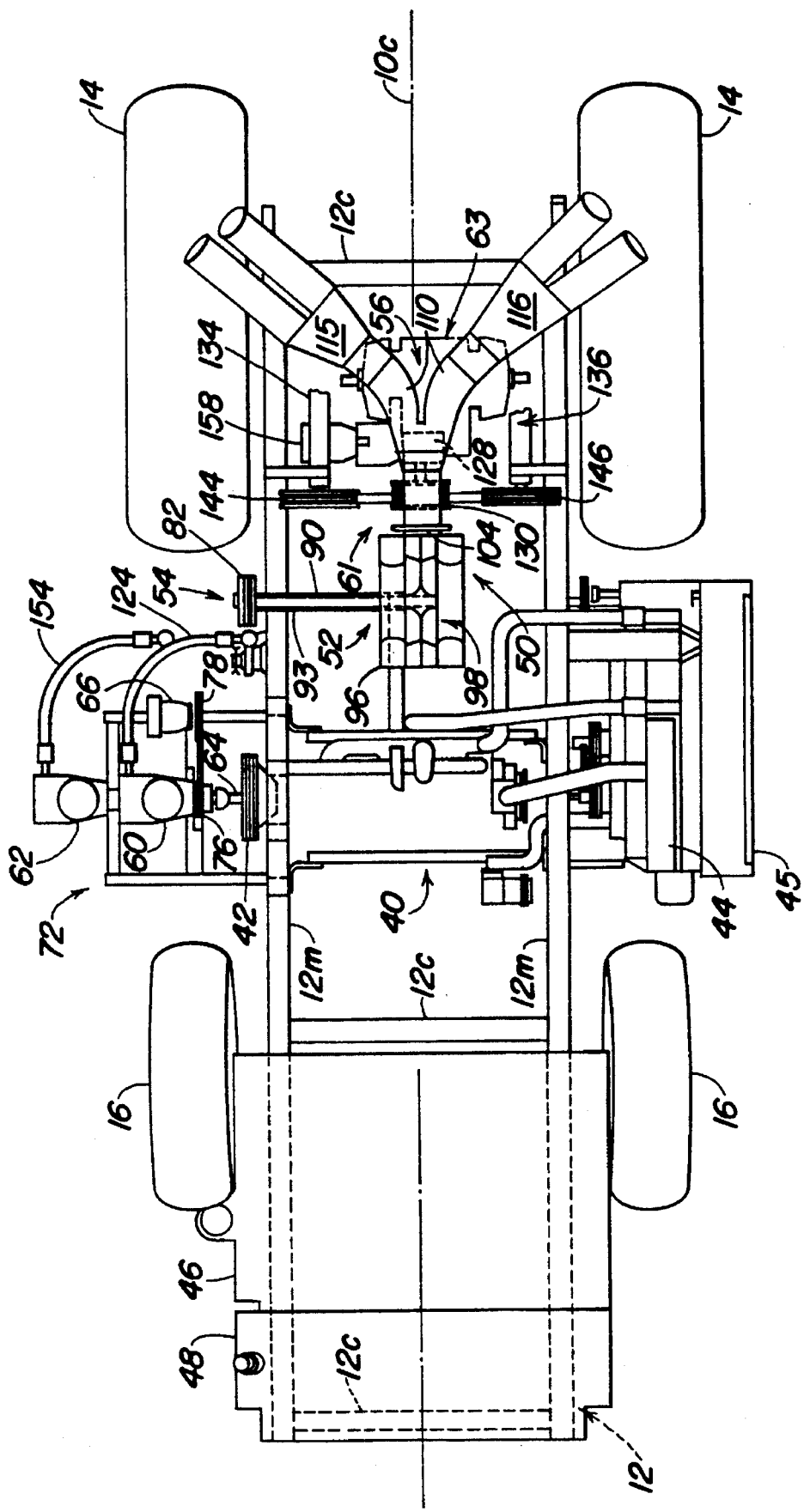
FIG. 2 is a top view of the chassis of the harvester of FIG. 1 with portions removed to better show the fan, engine and tank configuration.

Referring now to FIGS. 1 and 2, therein is shown a cotton harvester 10 having a fore-and-aft extending main frame 12 with main side frame beams 12m and a plurality transverse connecting members 12c. The frame 12 is generally rectangular in configuration and is supported horizontally above the ground on forward drive wheels 14 and aft steerable wheels 16. A cab 18 is centered between the drive wheels 14 and includes floor structure 18f. A plurality of row units 20 are supported from the forward end of the frame 12 in transversely spaced relationship for vertical movement between transport and field-working positions by a conventional lift system (not shown). Each row unit houses a conventional cotton picking structure including spindle drums 22 rotatable by row unit drives 23 about upright axes for moving columns of spindles into picking relationship with cotton plants. Cotton conveying ducts 24 extend upwardly and rearwardly from the units 20 to a cotton basket 30 carried on the frame 12 behind the cab 18.

Detailed Description of the Chassis:

The harvester 10 is powered by an engine 40 mounted transversely on the frame 12 between the front drive wheels 14 and the rear wheels 16. A main drive sheave 42 mounted on the engine crankshaft projects outwardly from the side frame beam 12m on one side (the left side as shown in FIG. 2) of the frame 12. A radiator 44 and a mechanical air cleaner 45 are supported on the opposite or right side of the frame 12 outwardly of the beam 12m between the front and rear wheels 14 and 16. Preferably, the cleaner 45 is a self-cleaning rotary screen cleaner generally of the type utilized on the John Deere Model 9000 Combine. Such a cleaner is also shown in U.S. Pat. No. 5,183,487 of common ownership with the present application.

A water or cleaning solution tank 46 is supported near the aft end of the frame 12. A fuel tank 48 is also mounted on the aft end of the frame 12 closely adjacent the aft face of the tank 46. The water tank 46 and fuel tank 48 lie substantially entirely behind the axles of the wheels 16 and include transverse ledges 47 and 49, respectively, supported on the tops of the beams 12m. The tank 46 is L-shaped (FIG. 1) and extends rearwardly from a location above the axles of the wheels 16 and downwardly to a lowermost section below the beam 12m. The fuel tank 48 includes a forward face abutting against the rear face of the tank 46 and also extends below the frame 12. When filled or partially filled, the tanks have a relatively low center of gravity. Both tanks 46 and 48 have sidewalls which diverge outwardly at bend locations 46b and 48b above the frame 12 to provide increased capacity and conform generally to the profile of the harvester 10.

An air system 50 includes a centrifugal fan assembly 52 (FIG. 2) supported by the frame 12 generally on the centerline 10c of the harvester forward of the engine 40 and behind the cab 18. A fan drive 54, partially located outwardly of the frame 12, operably connects the engine sheave 42 and the fan assembly 52. A centralized air distribution chamber 56 is connected to the fan assembly 52 and to flexible air tubings 58 and 58' adjacent the cab floor 18f to distribute air to the cotton conveying ducts 24.

A hydraulic pump 60 for powering a row unit drive 61 and a second pump 62 for powering a hydraulic transmission 63 are connected in tandem and in line with the transverse engine 40 on the left side of the frame 12. The pump 60 is connected to the engine crankshaft by a drive shaft 64. A hydraulic accessory pump 66 for machine functions such as row unit lift, basket dump, and compactor drive is connected to an auxiliary frame 72 which extends outwardly from the main frame 12. The pump 66 is driven by a belt drive including a sheave 76 located between the engine and the first pump 60, and a sheave 78 on the pump shaft. The auxiliary frame 72 provides support and protection for the pumps 60, 62 and 66. A beam reinforcing weldment 12w extends over the area of the sheave 42 at the left end of the engine, and engine mounting brackets depend from the weldment area.

Detailed Description of the Air System:

The main drive sheave 42 on the engine 40 is aligned with a sheave 82 outside of the beam 12m and driven by a belt 86 An electric clutch 88 remotely operable by a fan switch (not shown) in the cab 18 is supported with the sheave 84 on the distal end of a transverse shaft 90. The shaft 90 is rotatably mounted by bearings 91 and 92 in a tube 93 which extends toward the center of the harvester and is connected to a fan housing 96 with sides defining central air inlets 98 of circular configuration. The inner end of the shaft 90 is connected to a fan rotor 100 located generally on the centerline 10c of the harvester 10. The rotor 100 rotates about the transverse and generally horizontal shaft axis slightly above the plane defined by the top of the frame beams 12m. Inner and outer brackets 102 and 103, which are part of a weldment which includes the tube 92 and are connected fan housing 96, support the fan assembly 52 on the frame 12 and provide improved shaft alignment and reduced lubrication requirements.

Figure 3:
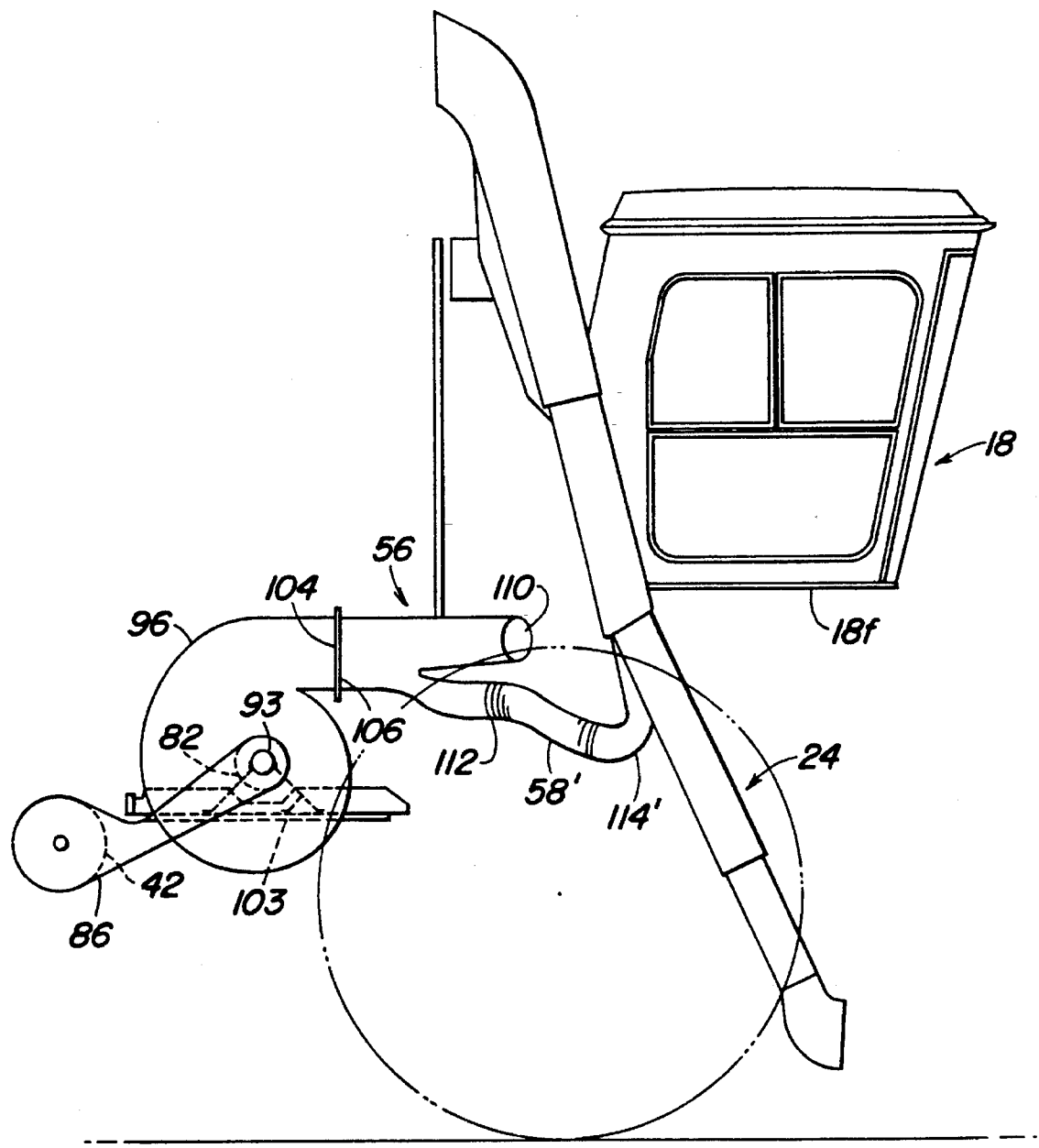
FIG. 3 is an enlarged side view of the forward portion of the harvester of FIG. 1 showing the fan structure relative to the cab and inner conveying ducts.
Figure 4:
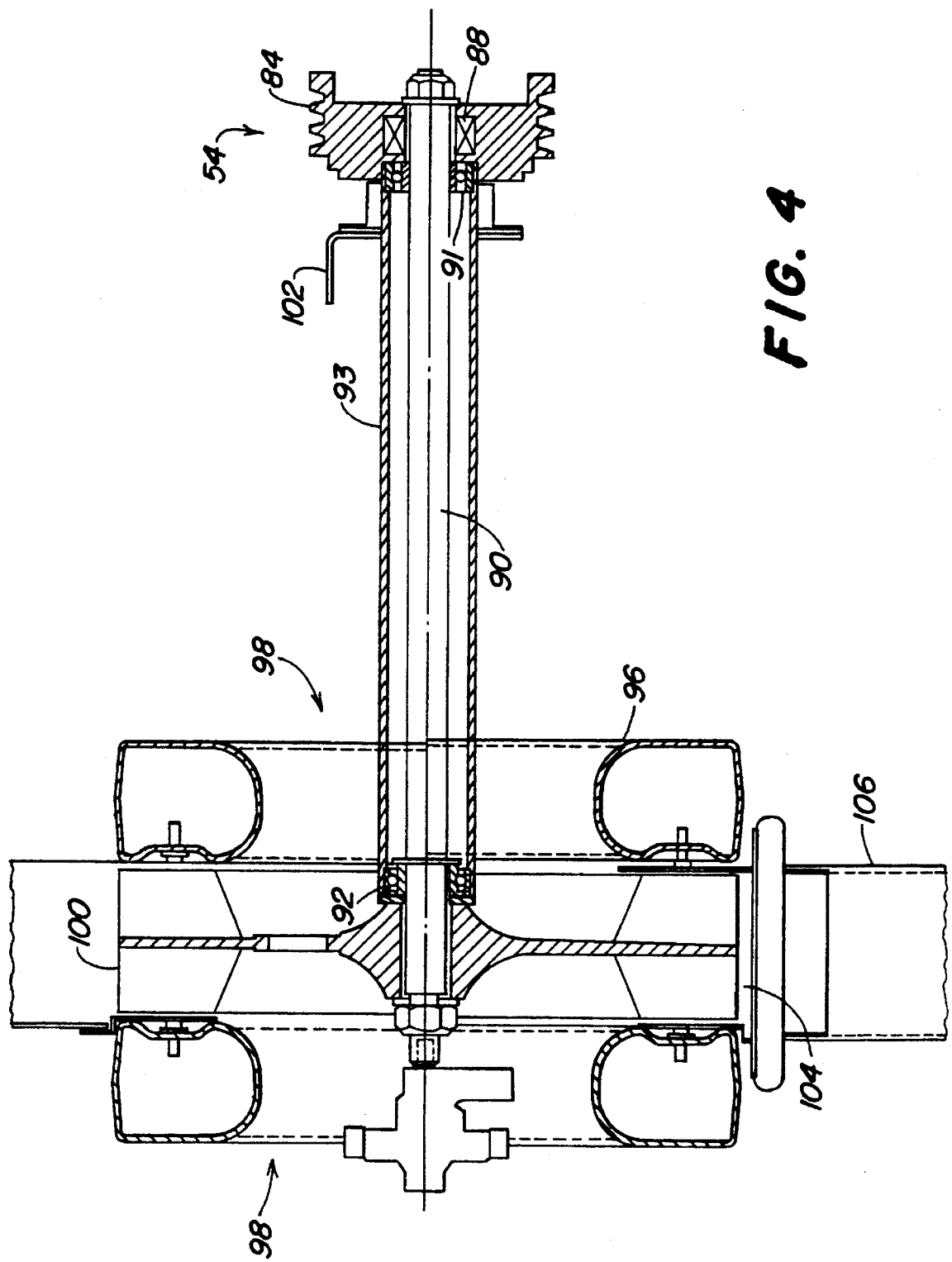
FIG. 4 is an enlarged top view, partially in section, of the fan assembly and water pump for the harvester of FIG. 1.

The fan housing 96 extends upwardly and forwardly (FIG. 3) to an upper fan outlet 104 which opens in the forward direction on the harvester centerline 10c just below the level of the cab floor 18f. The air distribution chamber 56 includes a rear portion 106 which is connected to and opens into the fan outlet 104. The chamber 56 includes a pair of upper output ports 110 opening forwardly and outwardly toward the outer row unit ducts 24. Located below the output ports 110 are a pair of forwardly opening output ports 112 connected by flexible tubings 58' to corresponding inner duct nozzles 114'. The ports 110 are connected to the respective outer duct nozzles 114 by the flexible tubings 58. The nozzles 114', 114 direct air upwardly into the ducts 24 to induce air flow in the ducts below the nozzles and propel cotton into the basket 30. In the embodiment shown in FIG. 2, the upper output ports 110 open into a pair of chamber extensions 115, 116 which divide the air flow from the ports 110 for delivery through the flexible tubings 58 to accommodate up to two pairs of outer row units 20. Individual outlet ports of the chamber extensions 115, 116 may be capped for harvester configurations having fewer row units.

The air distribution chamber 56 as shown directs air at a maximum angle of only about 45 degrees to the right and about 50 degrees to the left. Within the chamber extensions 115, 116 air is turned less than approximately 20 degrees. The flexible tubings 58 and 58' are substantially horizontal and provide a relatively non-tortious air path. Once in the flexible tubings 58 and 58' the air is directed to the nozzles by being turned along an arc of relatively large radius. The included angle between the ends of the arc is preferably about 110 degrees. The resulting direct air path from the fan to the nozzles has been found to increase air system efficiency by more than 15 percent over conventional harvester air systems for increased cotton handling capacity without increased power to the fan.

Figure 5:
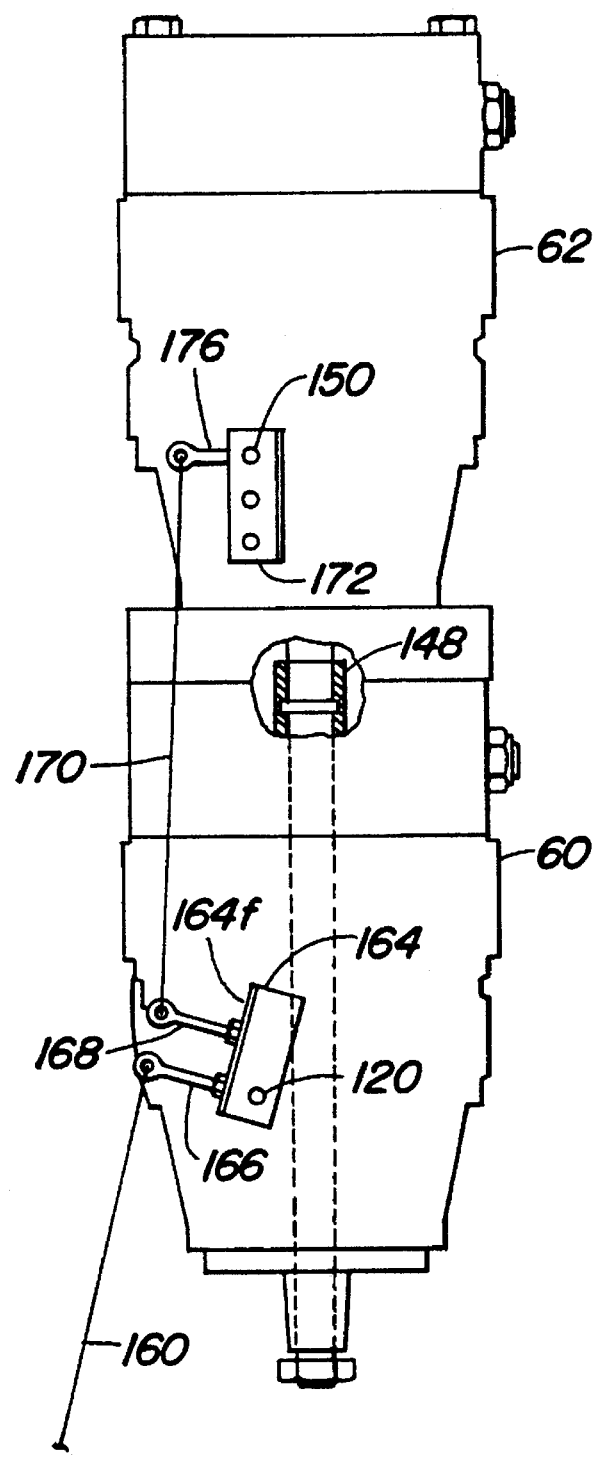
FIG. 5 is an enlarged bottom view of the tandem hydraulic pumps shown in FIG. 2, and showing control arm structure for varying relative output of the pumps to change the ratio of ground speed to row unit speed.

Detailed Description of the Row Unit and Ground Drives:

Referring to FIGS. 2 and 5, the row unit drive pump 60 is preferably an axial piston variable displacement pump having a control arm with pivot 120 rotatable about a pivot axis to vary pump output. A hydraulic line 124 connects the pump 60 to a constant displacement hydro motor 128 on the row unit drive 61. The motor 128 is mounted at a central location on one of the transverse connecting members 12c by a bracket which extends upwardly form the frame at a location forwardly adjacent the fan outlet 104. A sheave 130 is connected to the motor 128 for rotation about a fore-and-aft extending axis. Two row unit drive shaft assemblies 134,136 are connected by brackets to the frame 12 and include pulleys 144,146 driven by belts trained around the sheave 130. The assemblies 134,136 are similar in construction to the tube and shaft arrangement described above for the fan drive 54 and include enclosed, bearing mounted shafts extending forwardly to connections with the row unit drives 23.

The pump 62 is an axial piston variable displacement pump similar to the pump 60. The pump 62 is fixed to the outer end of the pump 60, and the pump shafts are aligned and are connected at location 148 (FIG. 5). The pump 62 includes a control arm with a pivot 150 rotatable about a pivot axis to vary pump output. A hydraulic line 154 connects the pump 62 to a constant displacement hydro motor 158 which powers the transmission 63 to drive the wheels 14. The pumps 60 and 62 are preferably of the type known as Series 90 pumps commercially available in the tandem arrangement from Sauer Sundstrand Corporation of Ames, Iowa.

As shown in FIG. 5, control of the pumps 60 and 62 is provided via push-pull cable 160 connected at a first end to a control lever (not shown) in the cab 18 and at a distal end to a control linkage on the pumps. The control linkage shown in FIG. 5 includes an L-bracket 164 fixed for rotation with the pump (60) control arm pivot 120. An eye-bolt 166 is mounted on an upright flange f of the bracket 164 and is connected to the cable 160 at a location radially outwardly of the pivot 120. A second eye-bolt 168 is connected to the bracket 164 and to the proximate end of a connecting link 170. A second L-bracket 172 is fixed for rotation with the pump (62) control arm pivot 150. An eye-bolt 176 extends radially from the bracket 172 and is connected to the distal end of the link 170 such that the control arms are operated in unison from the single push-pull cable 160 to simultaneously vary the outputs of the pumps 60 and 62.

Preferably, the control linkage of FIG. 5 is adjustable to provide a range of row unit speed/ground speed ratios generally centered about a ratio wherein the speed of the drums 22 is synchronized with the ground speed of the harvester 10. The relative outputs of the pumps 60 and 62 may be varied from those which provide fully synchronized drum/ground speed operation in order to speed up or slow down the unit drive relative to ground drive for accommodating various harvesting conditions including unusually high- or low-yielding cotton. Speed ratios may be adjusted by varying the length of the connecting link 170 to vary the angular relationship of the control arm pivots. Alternatively, ratio adjustment may be achieved by changing the length of eye-bolt 168 or 176 protruding from the corresponding bracket flange, or by placing one of the eye-bolts in a different hole location along the length of the corresponding L-bracket. It is to be understood that numerous arrangements for varying the control arm positions relative to each other may be employed, including commercially available remotely adjustable linkages specifically designed for the Series 90 pumps.

The linkage structure between the control arm pivots 120 and 150 is preferably adjustable such that the relative outputs of the pumps can be varied sufficiently to provide row unit/ground drive speed variations in a range of approximately ±5% from the synchronized condition. For example, in low-yielding cotton where high ground speeds are desirable, the linkage is adjusted to lower row unit drive speed relative to ground speed so that spindle overspeed conditions are avoided. In high-yielding cotton, slower ground speed drive is desirable without slowing spindle speed below a minimum speed wherein picking efficiency noticeably deteriorates, so the linkage is adjusted to increase row unit drive speed relative to ground speed.

Having described the preferred embodiment, it will become apparent that various modifications can be made without departing from the scope of the invention as defined in the accompanying claims.

We claim:

1. In a cotton harvester having a fore-and-aft extending main frame supported for forward movement in a range of speeds over the ground by forward drive wheels and rear steerable wheels, a hydraulic transmission connected to the drive wheels, at least one row unit connected to the forward end of the frame and having variable speed harvesting structure including a spindle drum rotatable about an upright axis for removing cotton from rows of cotton plants, an engine supported by the frame and having a crankshaft rotatable about an axis, controllable drive structure comprising:

a first hydraulic motor drivingly connected to the transmission;

a second hydraulic motor drivingly connected to the row unit harvesting structure;

first and second variable output pumps connected to the first hydraulic motor and second hydraulic motor, respectively, the pumps connected in tandem at one end of the engine and drivingly connected to the engine;

means for selectively varying the output of the first and second pumps relative to each other for varying the ratio of the harvesting structure to the forward ground speeds, the means for selectively varying including an adjustable linkage extending between the pumps; and wherein the engine is supported on the frame transverse to the forward direction and the pumps extend axially outwardly from the engine.

2. The invention as set forth in claim 1 wherein the first and second pumps are connected in axial alignment at one end of the engine.

3. The invention as set forth in claim 2 wherein the pumps include drive axes which are supported in axial alignment with each other and with the crankshaft axis at one end of the engine.

4. The invention as set forth in claim 2 wherein the engine is supported on the frame transverse to the forward direction and the pumps extend transversely outwardly from the engine at one side of the frame.

5. The invention as set forth in claim 2 wherein the first and second hydraulic motors comprise fixed displacement motors, and the variable output pumps comprise variable displacement pumps with moveable control arms, and means for moving the control arms in unison from a remote location.

6. The invention as set forth in claim 5 wherein the adjustable linkage comprises means for adjusting the positions of the control arms relative to each other.

7. The invention as set forth in claim 5 wherein the means for moving the control arms in unison comprises a push-pull cable connected to one of the control arms and a link connected between the control arms.

8. The invention as set forth in claim 2 further including an a third pump connected to the frame adjacent the variable output pumps, a sheave connected for rotation with the crankshaft, and a belt drive connecting the third pump and the sheave.

9. The invention as set forth in claim 2 wherein the means for varying the output of the first and second pumps includes linkage structure for varying the output of the second pump relative to the first pump over a range of outputs, the range of outputs including an output wherein the ground speed and drum speed are synchronized.

10. The invention as set forth in claim 1 wherein the frame includes a fore-and-aft extending main frame structure supporting the engine, and further including an auxiliary frame extending outwardly from the main frame structure and supporting the pumps therefrom.

11. The invention as set forth in claim 10 further including a third pump connected to the auxiliary frame adjacent the variable output pumps, a sheave connected for rotation with the crankshaft, and a belt drive connecting the third pump and the sheave.

12. In a cotton harvester having a fore-and-aft extending main frame supported for forward movement in a range of speeds over the ground by forward drive wheels and rear steerable wheels, a hydraulic transmission connected to the drive wheels, at least one row unit connected to the forward end of the frame and having variable speed harvesting structure including a spindle drum rotatable about an upright axis for removing cotton from rows of cotton plants, an engine supported by the frame and having a crankshaft rotatable about an axis, controllable drive structure comprising:

a first hydraulic motor drivingly connected to the transmission;

a second hydraulic motor drivingly connected to the row unit harvesting structure;

first and second variable output pumps connected to the first hydraulic motor and second hydraulic motor, respectively, the pumps connected in tandem at one end of the engine and drivingly connected to the engine;

means for selectively varying the output of the first and second pumps relative to each other for varying the ratio of the harvesting structure to the forward ground speeds, the means for selectively varying including an adjustable linkage extending between the pumps; and wherein the pumps include drive axes which are supported in axial alignment with each other and parallel to the crankshaft axis at one end of the engine.

13. The invention as set forth in claim 12 wherein the engine is supported on the frame transverse to the forward direction and the pumps extend transversely outwardly from the engine at one side of the frame.

14. The invention as set forth in claim 13 wherein the first and second hydraulic motors comprise fixed displacement motors, and the variable output pumps comprise variable displacement pumps with moveable control arms, and means for moving the control arms in unison from a remote location.

15. The invention as set forth in claim 13 further including an auxiliary frame selectively attachable to the main frame and supporting the variable output pumps.

* * * * *